UNITED STATES PATENT OFFICE.

GUSTAVUS MICHAELIS, OF ALBANY, NEW YORK.

PURIFYING ETHYL ETHER.

1,189,602.   Specification of Letters Patent.   Patented July 4, 1916.

No Drawing.   Application filed April 23, 1915.   Serial No. 23,517.

*To all whom it may concern:*

Be it known that I, GUSTAVUS MICHAELIS, a citizen of the United States of America, and a resident of the city of Albany, in the county of Albany and State of New York, have invented a certain new and useful Process for Purifying Ethyl Ether, of which the following is a full, clear, and exact description, such as will enable others skilled in the art to which it appertains to carry out the same.

The present invention relates broadly to a process for the manufacture of ethyl ether free from the impurities present in the ethyl ethers of different qualities sold in the United States. Ethyl ether, which has been known under the name of "sulfuric ether" for several hundred years, is a colorless volatile liquid, extensively used in the arts and in medicine. Ethyl or sulfuric ether used in the arts is not necessarily of the same purity as the kind called for in medicine, where a very pure article is demanded, especially if it is to be used for anesthesia.

Hanger, in his *Commentary to the 6th Edition of the Prussian Pharmacopœia*, was the first to describe a process for the manufacture of ether. It is divided in two parts. The first part outlines a method to make crude ether, and the second tells how to purify this crude ether by washing same with milk of lime and finally distilling it in a rectifying apparatus. This method was greatly improved by the introduction by Squibb of an apparatus for the continuous manufacture of ether by steam. This apparatus made it a comparatively safe and easy process, especially as by the introduction of a wash tank filled with a solution of caustic soda or potassa, sulfuric and sulfurous acids are readily removed and purified ether is obtained in one operation. But even this highly improved apparatus did not and does not eliminate all the impurities of which the more frequent are undue amounts of grain alcohol and water, acetic and other acids, various aldehydes, peroxids, and vinyl and other alcohols. Some of these impurities lead to a gradual decomposition of ether, while others are detrimental to the patient. To the first class belong water and alcohol, while to the second class belong the aldehydes, peroxids, acetic and other acids, and vinyl and other alcohols.

As stated before, it has heretofore been difficult to remove all these impurities, but I have been successful in perfecting a process by which they are easily eliminated and my invention is the production of such a purified ether. A clear description of same is as follows: Pure ether and a caustic alkali, either in solid form or in solution are placed in a rectifying still which is fitted with a stirring apparatus, and a reflux cooler and condenser. The ether is brought to its boiling point while the stirring apparatus is set in motion, and with the aid of the reflux cooler the recondensed ether is again and again brought in contact with the alkali. This refluxing and stirring has to be continued until the desired result is obtained. In order to ascertain whether the process of destroying the impurities goes on perfectly, small samples of the refluxing ether are from time to time tested with Nessler's reagent. It is to be observed that while at the commencing of the process the ether deposits a black precipitate with this reagent, gradually as the destruction of the impurities proceeds, the same becomes lighter and lighter until finally, there is no further precipitation. Or, in other words, the purifying process has to be continued until a test sample taken remains indifferent toward Nessler's reagent, the well shaken mixture remaining first colorless, eventually showing no more than a faint white opalescence.

The test is carried out as follows: 10 cc. of a sample of the condensed ether are shaken with 1 cc. of Nessler's well-known reagent and the result is observed. Having finished the purifying process, the ether is removed by distillation, without further increase of temperature, the distillation being continued until it stops voluntarily. This done, water is added to the contents remaining in the still, the temperature is raised, and the regenerated alcohol is removed by distillation. After cooling, the residue in the still consists of a more or less diluted solution of caustic soda or potassa, as the case may be, and this solution is advantageously used as a neutralizing agent for the washing tank which is a part of the continuous ether apparatus.

The ether purified by this process has a specific gravity of about .710 at 25° C. If 100 ccs. of same are placed in a flask fitted with a thermometer and subjected to distillation, it will commence to distill at 34° C., showing absence of lower boiling substances, and all of it will have distilled over at 36° C. Or, in other words, all of the 100 ccs. ether distilling within 2° show absence of both lower and higher boiling impurities. If 10 ccs. of this pure ether are shaken with 1 cc. of Nessler's reagent, there will be at first no discoloration whatever, but gradually a slight white opalescence will appear. The ether will further answer negatively to all known tests for impurities heretofore found in ether.

I do not limit myself to the use of caustic alkali in its solid form, and where I use the term caustic alkali in the specification and claims I mean to include caustic alkali in either solid form or in any solution thereof that will produce the desired result.

It has been found that in some cases heating with solid caustic alkali as specified during a period of 60 to 70 hours is required to effect the desired purification, as indicated by the specified test, although the time required varies somewhat with different quantities and qualities of material under treatment.

What I claim as my invention and desire to secure by Letters Patent is:

1. The process for purifying ethyl ether, comprising placing commercially pure ether with a caustic alkali, stirring and raising the ether to its boiling point, recondensing the ether again and again, bringing it in contact with the alkali until upon examination of the ether it answers negatively to all known tests for impurities.

2. A process for treating ethyl ether, comprising placing commercially pure ether with a caustic alkali in a rectifying still fitted with a stirring apparatus and a reflux cooler and condenser, raising the ether to its boiling point while the stirring apparatus is set in motion, and with the aid of the reflux cooler the recondensed ether is again and again brought in contact with the alkali, repeating the process until upon examination the ether answers negatively to all tests for impurities heretofore found in commercially pure sulfuric ether.

In testimony whereof I have affixed my signature in presence of two witnesses.

GUSTAVUS MICHAELIS.

Witnesses:
FREDERICK W. CAMERON,
BEULAH CARLE.